Patented Sept. 23, 1924.

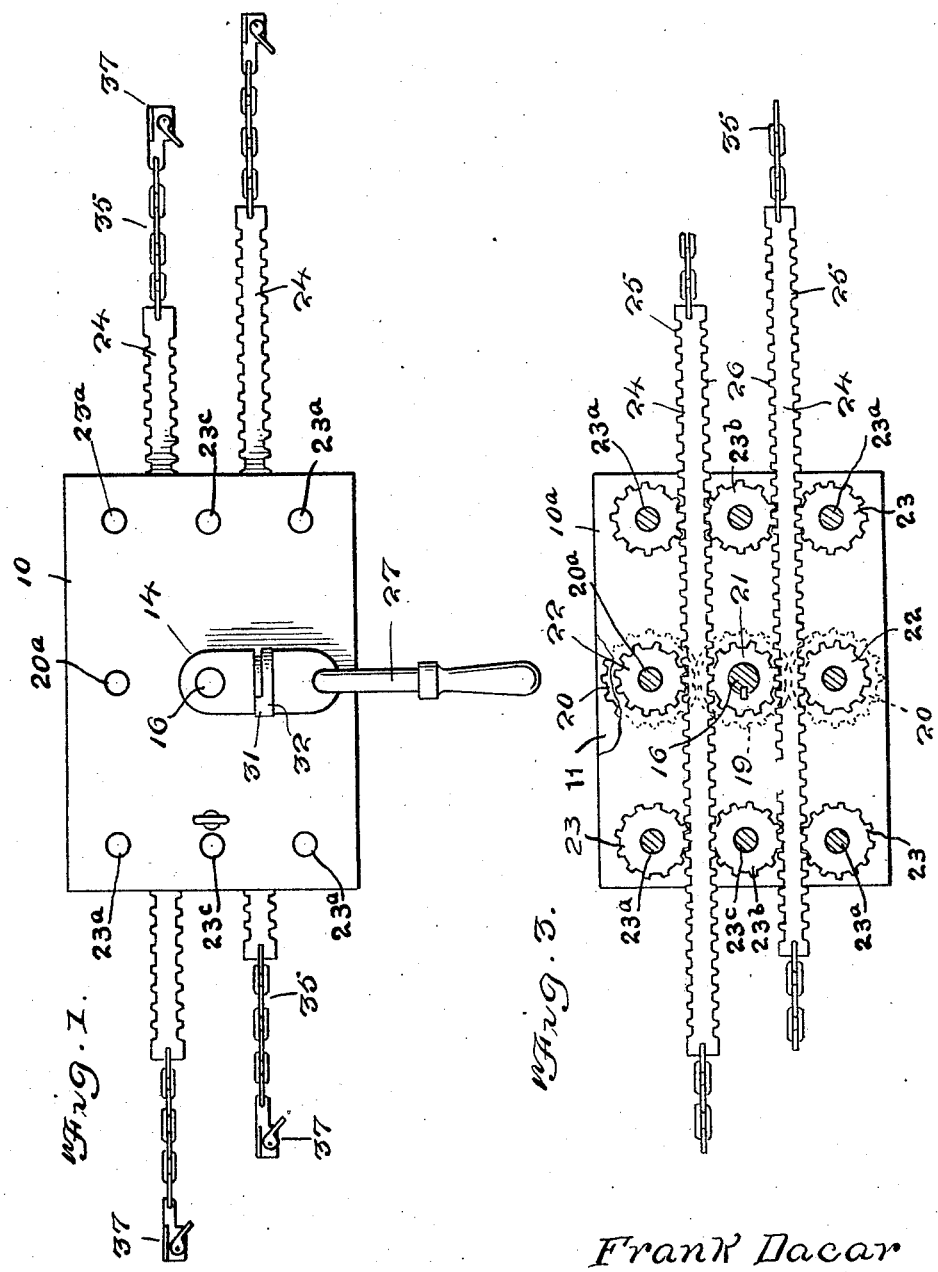

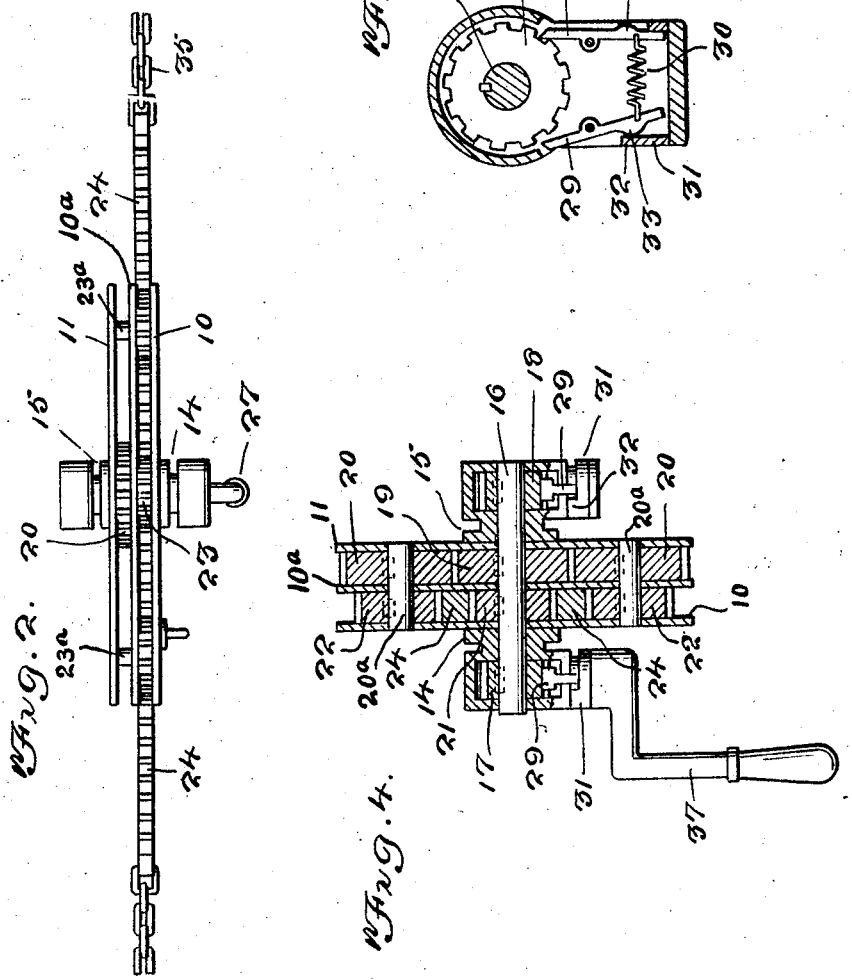

1,509,715

UNITED STATES PATENT OFFICE.

FRANK DACAR, OF HOLLOWAY, OHIO.

WIRE STRETCHER.

Application filed June 25, 1923. Serial No. 647,677.

*To all whom it may concern:*

Be it known that I, FRANK DACAR, a citizen of the United States, residing at Holloway, in the county of Belmont and State of Ohio, have invented new and useful Improvements in Wire Stretchers, of which the following is a specification.

This invention relates to wire stretchers and has for its object the provision of a novel gear operated device for stretching the line wires of fences or in fact any flexible members in a very simple manner and in such a way as to exert powerful leverage thereon.

An important object is the provision of a device of this character which includes triple gearing which will insure a smooth action.

An additional object is the provision of a device of this character which will be simple and inexpensive in manufacture, easy to operate, efficient and durable in service and a general improvement in the art.

With the above and other objects and advantages in view the invention consists in the details of construction to be hereinafter more fully described and claimed and illustrated in the accompanying drawings, in which:

Figure 1 is an elevation of one side of the device,

Figure 2 is an edge view,

Figure 3 is a longitudinal section,

Figure 4 is a central cross section,

Figure 5 is an enlarged detail view through one of the ratchet devices.

Referring more particularly to the drawings I have shown the device as comprising a pair of plates 10 and 10$^a$ and a single plate 11 arranged in spaced relation to the plate 10$^a$ carried by the plate 10 and plate 11 are housing members 14 and 15 respectively secured to the plates in any desired manner. Journaled through the entire device formed by the brackets and plates above described is an operating shaft 16 carrying ratchets 17 and 18 located respectively within the housings 14 and 15. Secured upon the shaft 16 is a gear 19 which meshes with gears 20 located between the plates 10$^a$ and 11 and carried by shafts 20$^a$. Between the plates 10 and 10$^a$ the shaft 16 carries a gear 21 while the shafts 20$^a$ carry gears 22. Also located between the plates 10 and 10$^a$ are gears 23 of the same size and type as the gears 22 and carried by shafts 23$^a$. The numeral 23$^b$ represents similar gears between the plates 10 and 10$^a$ and corresponding to the gear 21 and mounted on shafts 23$^c$.

Located between the plates forming the body are elongated racks 24 which are formed at their outer edges with a series of teeth 25 meshing with the gears 22 and 23, and which are formed at their inner edges with teeth 26 meshing with the gears 21 and 23$^b$.

In association with either end of the shaft 16 is a crank 27 adapted to be slid thereonto and pivoted at 28 within this crank are pawls 29 which are spring pressed apart by a spring 30 and these pawls co-operate with the ratchets 17 and 18. I also provide a rotatably mounted collar 31 which is movable and which has a projection 32 co-operating with projections 33 on the pawls in such a way that when this collar is turned in one direction, one pawl will be in operative relation to the ratchet while the other pawl will be idle and this relation is reversible.

At their outer ends the racks 24 carry chains 35 on the ends of which are rings carrying wire engaging clamps 37.

In the operation the device is first set by turning the crank to extend the bars and two of the wire engaging clamps 37 are then engaged upon the wires to be stretched. When the crank is then rotated it is apparent that the ends of this pair of racks will be drawn together, tightening the wire. When the wire has been tightened as much as possible in this manner, the other pair of clamps is engaged with the wire and the action of the racks is reversed so as to obtain a still greater tightening effect. By manipulating the pawl controlling collars, the proper setting may be made.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. A wire stretcher comprising a body member, a plurality of guide gears journaled therein, a shaft journaled through the body and provided at both ends with ratchets, a crank handle engageable upon either end of the shaft and carrying selectively usuable pawls cooperating with the shaft, a drive gear on said shaft within the body and a pair of rack bars slidable through the body in engagement with the drive gear and guide gears, said rack bars being equipped with wire engaging members.

2. A wire stretcher comprising a body member, a plurality of guide gears journaled therein, a shaft journaled through the body and provided at both ends with ratchets, a crank handle engageable upon either end of the shaft and carrying selectively usable pawls cooperating with the shaft, a drive gear on said shaft within the body and a pair of rack bars slidable through the body in engagement with the drive gear and guide gears, said rack bars being equipped with wire engaging members, certain of the guide gears being located outwardly of the rack bars and others being located therebetween.

3. A wire stretcher comprising a body member including a pair of plates, a pair of rack bars located between the plates and carrying wire gripping means, said rack bars having both edges toothed, guide gears journaled between the plates and meshing with the teeth on the confronting edges of the rack bars, other guide gears journaled between the plates and meshing with the teeth on the outer edges of the rack bars and a gear for driving the rack bars.

4. A wire stretcher comprising a body member including a pair of plates, a pair of rack bars located between the plates and carrying wire gripping means, said rack bars having both edges toothed, guide gears journaled between the plates and meshing with the teeth on the confronting edges of the rack bars, other gears journaled between the plates and meshing with the teeth on the outer edges of the rack bars and means for driving the rack bars comprising a shaft journaled through the body and carrying a gear meshing with the teeth on the inner edges of the rack bars and carrying a larger gear located to one side of the pair of plates, and other gears meshing with said last named gear and carried by the shafts of certain of the second named gears.

In testimony whereof I affix my signature.

FRANK DACAR.